(No Model.)
P. SYNNESTVEDT.
TRIPLE VALVE FOR FLUID PRESSURE BRAKES.
No. 505,685. Patented Sept. 26, 1893.
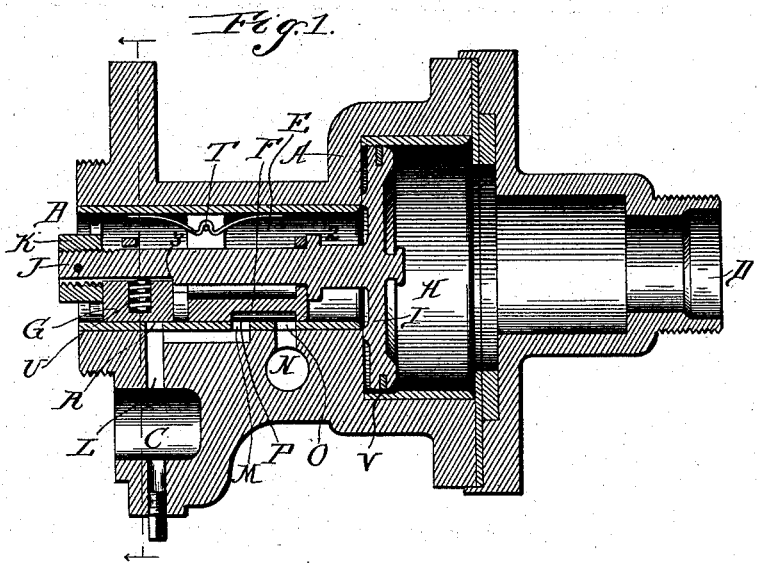
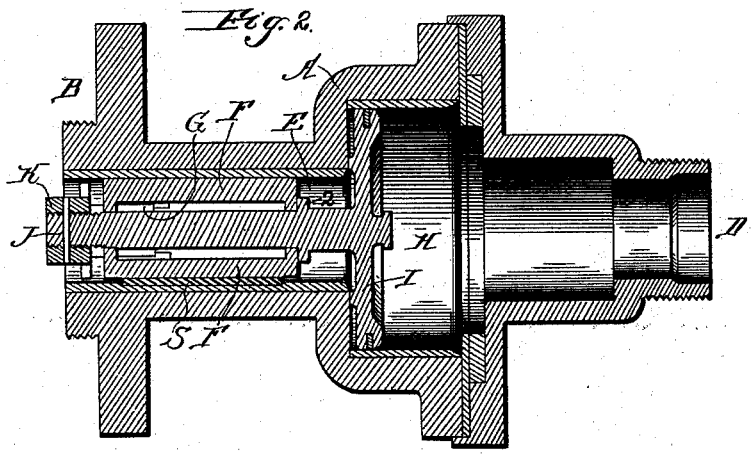
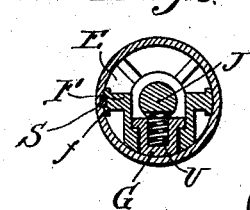
Witnesses:
Wm. M. Rheem
Wm. F. Henning
Inventor:
Paul Synnestvedt
By Raymond & Vieder
Attys.

United States Patent Office.

PAUL SYNNESTVEDT, OF CHICAGO, ILLINOIS, ASSIGNOR TO THE CRANE COMPANY, OF SAME PLACE.

TRIPLE VALVE FOR FLUID-PRESSURE BRAKES.

SPECIFICATION forming part of Letters Patent No. 505,685, dated September 26, 1893.

Application filed July 29, 1892. Serial No. 441,567. (No model.)

*To all whom it may concern:*

Be it known that I, PAUL SYNNESTVEDT, a citizen of the United States, residing in Chicago, in the county of Cook and State of Illinois, have invented certain new and useful Improvements in Triple Valves for Fluid-Pressure Brakes, of which the following is a specification, reference being had to the accompanying drawings.

My invention relates to what are commonly known as triple valves for fluid pressure brakes and more especially to the graduating valve by which the pressure in the brake-cylinder is proportioned to the reduction of pressure made in the train-pipe.

In the automatic fluid pressure brake an auxiliary reservoir is used upon each car for storing air pressure, and the function of the triple valve is to control the admission of air from the auxiliary reservoir to the brake cylinder and the exhaust of air from the brake-cylinder to the atmosphere, provision being also made for supplying air from the train-pipe to the auxiliary reservoir as it is needed. The said triple valves are commonly operated by means of a piston attached to the controlling valve or valves and subjected to the pressure of air from the train-pipe so that it will be moved as such pressure is varied.

One object of my invention is to provide for controlling and graduating the supply of air to the brake cylinder by means of sliding valves, as such valves are easily fitted so as to be tight, and will remain so in use. At the same time, excessive friction is avoided so that the graduation is sensitive and accurate.

In the accompanying drawings: Figure 1 is a central longitudinal section of a valve embodying my invention. Fig. 2 is a like section on a plane at right angles to that of Fig. 1. Fig. 3 is a cross section of a part of the valve chamber showing the fitting of the valves to each other and to their seats.

A is the valve casing which is provided with the usual openings B, C and D communicating with the auxiliary reservoir, the brake-cylinder and the train-pipe respectively. The parts named are not shown as their construction is well known and the operation of the valve is readily understood without them. The passage E communicating with the opening B is bushed with brass or other anti-corrosive metal and forms the seat for the valves F and G.

H designates a cylindrical chamber within which is fitted the triple valve piston I. The valves F and G are connected to said piston by the stem J. The valve F is fitted loosely between the collar 2 formed upon the valve stem J and the nut K screwed upon the outer end of the stem, as can be more clearly seen by reference to Fig. 2. The spindle J is milled off on its lower side as is seen in Fig. 1 and the valve F is slotted centrally for some distance from its outer end and in the space thus formed the valve G is fitted. The valve G fits with no lost motion between the nut K and the shoulder 3, milled in the valve spindle but has sufficient play to prevent binding. The slot in the valve F extends farther than the shoulder 3 so that the valve G is capable of a longitudinal motion independent of the other.

L designates a passage leading from the brake cylinder to a port M in the valve chamber E.

N designates a passage leading to the atmosphere from a port O in the valve chamber. The ports M and O are connected by the recess P in the valve F when the latter is in the position shown. From the passage L, a second port R opens into the valve chamber.

For the sake of facility in fitting, the valve chamber E is made cylindrical as shown by the section Fig. 3. To prevent the valves from displacement a feather S is let into the side of the valve chamber and engages a groove cut in the wing $f$ of the valve F. The valve F is held to its seat, independently of the air pressure upon it, by the spring T in the ordinary manner. A spring U serves in like manner to hold the valve G upon its seat. The usual feeding groove V is made past the piston I so that air can flow from the train-pipe to the auxiliary reservoir.

The operation of the devices above described is as follows: The usual position of the parts is that shown in the figures, in which there is a clear passage from the brake cylinder to the atmosphere through the opening C, passage L, ports M and O, recess P and passage N. In this position the brakes are off. If it be desired to apply the brakes a reduction of pressure in the train-pipe is made. The pressure in the auxiliary reservoir and the connecting valve chamber E, is then greater than that in the train-pipe. The piston I is thus forced over to the right. The first effect is to move the valve G. When the lost motion between the valve stem J and the valve F has been taken up, the latter also moves. The movement of the valve F closes the exhaust port N and the valve G subsequently uncovers the inlet port R. Air then passes from the auxiliary reservoir to the brake cylinder. When the pressure of air in the auxiliary reservoir has been lowered until it is slightly less than the pressure remaining in the train-pipe, the piston I will move to the left carrying with it the valve G, which having but a small surface, offers but slight resistance. The port R is thus closed and the flow of air from the auxiliary reservoir to the brake cylinder is cut off. As there is slack between the valve F and the stem of piston I the valve F will not be moved when the piston I starts on its reverse movement, and the greater resistance imposed by the valve F as soon as the slack has been taken up, will arrest the movement of the piston I. Thus while the supply of air to the brake-cylinder from the auxiliary reservoir has been cut off, the exhaust port will not be opened and the brakes will be held on with a degree of force proportional to the lowering of the pressure in the train-pipe. The restoration of the original pressure in the train-pipe will suffice, however, to overcome the additional resistance of the valve F and it will be moved to its original position, opening the passages for the escape of air from the brake-cylinder. The brakes will be thus released.

Without confining myself to the precise details of construction herein shown and described, I claim—

1. In a triple valve apparatus the combination with the piston and the stem thereof, of the slide valve attached to said stem without lost motion and alone controlling the inlet to the brake cylinder, and another slide valve connected to said stem with lost motion and alone controlling the exhaust from the cylinder, substantially as described.

2. In a triple valve apparatus the combination with the piston and the stem thereof, of a slide valve attached to said stem without lost motion and alone controlling the inlet to the brake cylinder, a spring confined between said valve and the stem for holding the former on its seat, and another spring seated slide valve connected to said stem with lost motion and alone controlling the exhaust from the cylinder, said valve playing between projections on the piston stem, substantially as described.

3. In a triple valve apparatus the combination with the piston and the stem thereof of a slide valve confined between a shoulder on the said stem and a removable nut on the end of the same, said valve alone controlling the inlet to the brake cylinder, a spring confined between said valve and the stem for holding the valve on its seat, and another spring seated slide valve connected to said stem with lost motion and alone controlling the exhaust from the cylinder, said valve playing between a shoulder on the stem and the removable nut on the end of the same, substantially as described.

4. In a triple-valve apparatus, the main piston and stem, in combination with a valve seat provided with port R leading to the brake cylinder and exhaust ports M and O, a sliding valve G fixed on the piston stem and arranged to control the port R, and a sliding valve F mounted on the same stem with lost motion and controlling the exhaust ports M and O, substantially as described.

PAUL SYNNESTVEDT.

Witnesses:
 IRWIN VEEDER,
 TODD MASON.